(12) United States Patent
Mano et al.

(10) Patent No.: US 12,744,782 B2
(45) Date of Patent: Sep. 22, 2026

(54) MANAGING AND CONTROLLING ACCESS TO INTERNET ADDRESSES

(71) Applicant: Accenture Global Solutions Limited, Dublin (IE)

(72) Inventors: Vicknesh Mano, Singapore (SG); Mazin Faour, Riyadh (SA); Muthu Raja Sankar, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/812,844

(22) Filed: Aug. 22, 2024

(65) Prior Publication Data

US 2026/0058952 A1 Feb. 26, 2026

(51) Int. Cl.
*H04L 9/40* (2022.01)
*H04L 41/06* (2022.01)

(52) U.S. Cl.
CPC .............. *H04L 63/10* (2013.01); *H04L 41/06* (2013.01)

(58) Field of Classification Search
CPC ................................ H04L 63/10; H04L 41/06
See application file for complete search history.

(56) References Cited

U.S. PATENT DOCUMENTS 9,332,022 B1 * 5/2016 Ashley ................ H04L 63/1433
9,626,159 B2 4/2017 Mahmud
11,336,689 B1 * 5/2022 Miramirkhani ..... H04L 63/0281
12,373,738 B1 * 7/2025 White ................ G06Q 30/0255
2020/0382533 A1 * 12/2020 Nabeel .................. H04L 43/045
2021/0136032 A1 * 5/2021 Kim .................... H04L 63/1425
2022/0360599 A1 * 11/2022 Corron ................ H04L 63/1425
2023/0096596 A1 * 3/2023 Cohen .................... G06Q 40/12 726/23
2023/0252324 A1 * 8/2023 Matlick ............... H04L 61/5007 706/12
2024/0015180 A1 * 1/2024 Locar .................. H04L 63/1483
2024/0078289 A1 * 3/2024 Gollapudi ........... G06F 11/3696
2024/0214422 A1 * 6/2024 Song ................... H04L 63/1483
2024/0289408 A1 * 8/2024 Chrysanthou ......... G06F 16/951

(Continued)

OTHER PUBLICATIONS

Koide, et al., "Detecting Phishing Sites Using ChatGPT," arXiv:2306.05816v2 [cs.CR] Feb. 15, 2024, 15 pages. Retrieved Sep. 27, 2024 [https://arxiv.org/pdf/2306.05816].

(Continued)

*Primary Examiner* — Trang T Doan
*Assistant Examiner* — Ethan V Vo
(74) *Attorney, Agent, or Firm* — Seed Intellectual Property Law Group LLP

(57) ABSTRACT

A method, system, and computer-readable storage media for identifying expected internet addresses and generating alerts. A list of internet addresses representing a history of internet addresses accessed by an entity is obtained. The list of internet addresses is processed using a foundation model to generate one or more predicted classifications of internet addresses. Further, a requested internet address is received from the entity. If the requested internet address is within the one or more predicted classifications of internet addresses, access to the requested internet address is allowed. If the requested internet address is outside of the one or more predicted classifications of internet addresses, an alert is transmitted to one or more monitoring entities.

20 Claims, 9 Drawing Sheets

(56) References Cited

U.S. PATENT DOCUMENTS

| | | | | |
|---|---|---|---|---|
| 2024/0388603 | A1* | 11/2024 | Xu | H04L 63/1483 |
| 2024/0406198 | A1* | 12/2024 | Pan | H04L 63/1425 |
| 2025/0077871 | A1* | 3/2025 | Berlowitz | G06N 3/09 |
| 2025/0254183 | A1* | 8/2025 | Paul | H04L 63/1416 |

OTHER PUBLICATIONS

Gp Sandhu, "AquaSpam: Detecting phishing webpages by leveraging the "reasoning" skills of LLMs", Medium, Sep. 24, 2023, 15 pages.

* cited by examiner

MANAGING AND CONTROLLING ACCESS TO INTERNET ADDRESSES

FIELD

Various embodiments described herein relate generally to computer-implemented method, computer system, and computer program product for managing and controlling access to internet addresses.

BACKGROUND

Internet addresses (i.e., Uniform Resource Locators (URLs)) are global addresses referring to network resources within a computer network (e.g., the Internet). Accordingly, an internet address is used for identifying a location of a network resource within the computer network and retrieving the network resource. For example, the internet address may be input to a web browser and the network resource (e.g., a web page) may be displayed in the web browser.

SUMMARY

Implementations of the present disclosure enable identification of expected internet addresses based on a sequence of internet addresses accessed by an entity. Implementations of the present disclosure further generate alerts if an internet address requested by the entity is outside of the expected internet addresses. In at least one implementation, a secure/trusted internet address is predicted with high accuracy and without relying on any whitelist/blacklist of internet addresses.

In at least one example, the present disclosure provides a method for identifying expected internet addresses and generating alerts. The method may include obtaining a list of internet addresses. The list of internet addresses represents a history of internet addresses accessed by an entity. The method may further include generating, using the foundation model, one or more predicted classifications of internet addresses, based on the list of internet addresses. The method may further include receiving a requested internet address from the entity. The method may include determining if the requested internet address is within the one or more predicted classifications of internet addresses. The method may include allowing access to the requested internet address, in response to a determination that the requested internet address is within the one or more predicted classifications of internet addresses. The method may include sending an alert to one or more monitoring entities, in response to a determination that the requested internet address is outside of the one or more predicted classifications of internet addresses.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Various embodiments in accordance with the present disclosure will be described with reference to the drawings, in which.

Like reference numbers and designations in the various drawings indicate like elements.

DETAILED DESCRIPTION

Figure 1:
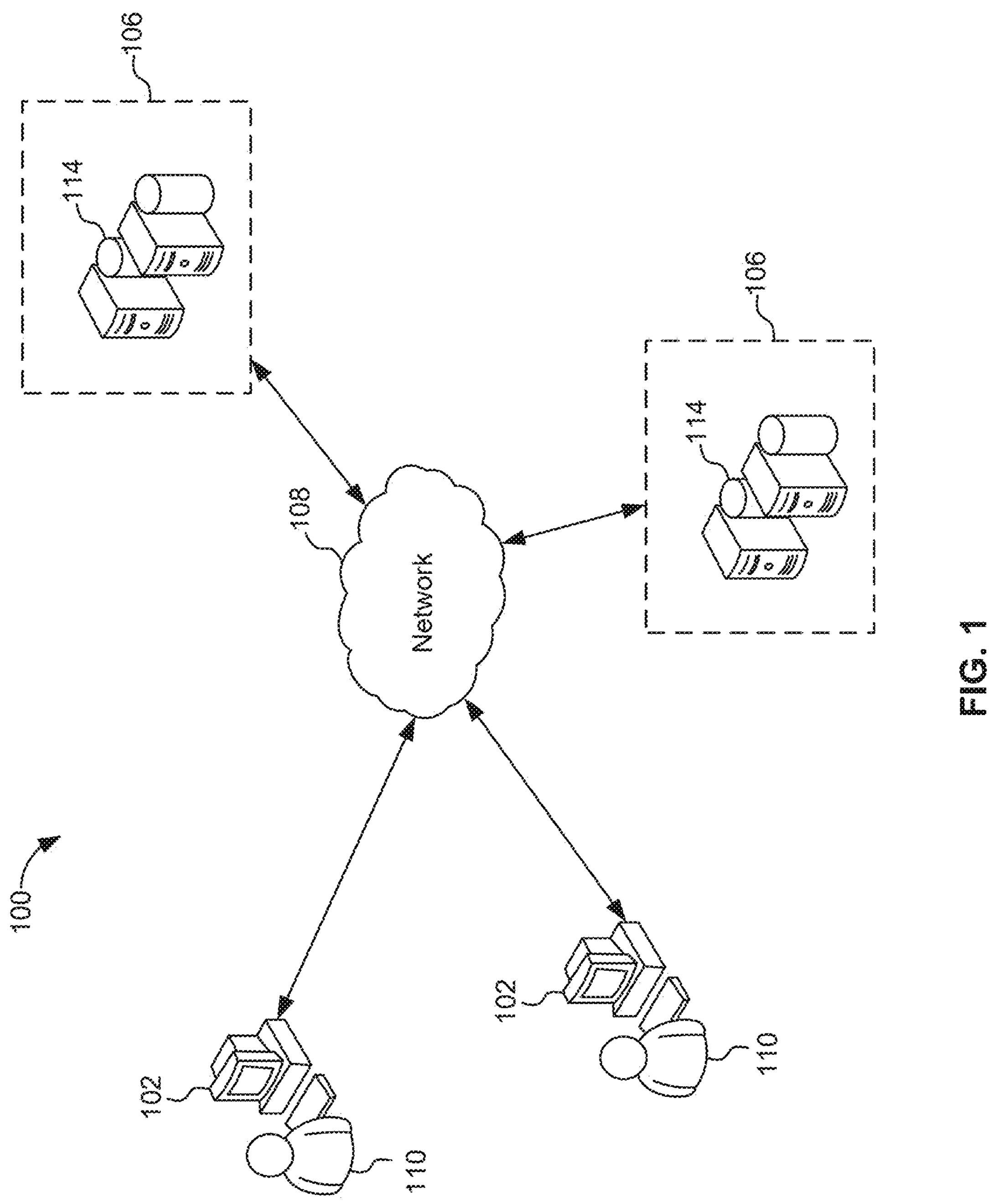
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term “comprising” when utilized means “including, but not necessarily limited to”; it specifically indicates open-ended inclusion or membership in the so-described combination, group, series and the like.

The term “a” means “one or more” unless the context clearly indicates a single element.

“First,” “second,” etc., re labels to distinguish components or blocks of otherwise similar names but does not imply any sequence or numerical limitation.

“And/or” for two possibilities means either or both of the stated possibilities (“A and/or B” covers A alone, B alone, or both A and B take together), and when present with three or more stated possibilities means any individual possibility alone, all possibilities taken together, or some combination of possibilities that is less than all of the possibilities. The language in the format “at least one of A . . . and N” where A through N are possibilities means “and/or” for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope as set forth in the claims.

Internet addresses are integral to functioning of the computer network. With a rapid use of Internet technology, many of the day-to-day activities are reliant on online services, which involve accessing of network resources (for example, webpages/websites). Due to which, prevalence of online fraud and malicious attacks may increase. Internet addresses are vulnerable to such malicious attacks, as the internet addresses are used as cost-effective tools to access the webpages. For example, malicious internet addresses may be created as part of the malicious attacks to promote scams or fraudulent activities. The malicious internet addresses are persuasive in nature and intended for gaining and transferring sensitive and personal information of users to control and command (C2) servers, thereby, compromising security of computing devices being used by the users. Therefore, it is important to identify whether the internet addresses are malicious internet addresses or not, while accessing the network resources.

Various methods/approaches are employed for identifying the malicious internet addresses. A rule-based approach is commonly used. However, such a method is limited in their ability to evolve with the constantly changing malicious attack landscape. For example, in accordance with the rule-based approach, an internet address is compared against whitelist internet addresses (e.g., safe/trusted internet addresses) and blacklist internet addresses (e.g., malicious internet addresses). If the internet address falls within the blacklist internet addresses, then the respective internet address is determined as a malicious internet address. However, such a rule-based method may be effective only when the blacklist internet addresses are updated in timely manner to reflect new threats. In addition, the rule-based approach is time consuming and requires an increasing number of resources to maintain the whitelist and blacklist internet addresses, which may be prone to evasion.

Additionally, in some examples, Artificial Intelligence (AI) models or Machine Learning (ML) models are used for classifying the internet addresses into the malicious internet addresses. Such a classification may be performed by evaluating point-in-time information of the internet addresses and the associated webpages. However, the classification performed utilizing the AI models or ML models may have tendency to falsely flag “uncommon internet addresses” due to rarity or absence in training data. Therefore, using the AI or ML models for classification of the internet addresses may have low precision in determining the malicious internet addresses.

Implementations of the present disclosure identify expected internet addresses and generate alerts. The expected internet addresses are identified by evaluating a list of internet addresses accessed by an entity, using a foundation model. Further, the alerts are generated to the entity and a monitoring entity when the internet address received from the entity is outside of the identified expected internet addresses. The monitoring entity may take appropriate action against the internet address that is outside of the expected internet address (e.g., malicious internet address). Therefore, malicious browsing activity may be identified with high accuracy and the entity may be prevented from malicious attacks.

FIG. 1 depicts an example environment 100 that may be used to execute implementations of the present disclosure. As depicted in FIG. 1, the example environment 100 includes one or more entities 102, one or more back-end systems 106, and a network 108. The entities 102 and the back-end systems 106 may be communicated with each other using the network 108. In some examples, the network 108 may include, but is not limited to, a Local Area Network (LAN), a Wide Area Network (WAN), the Internet, or a combination thereof, and connects the entities 102, and the back-end systems 106. In some examples, the network 108 may be accessed over a wired and/or a wireless communication link.

The entities 102 (also be referred to as computing devices) are used by respective users 110 to access network resources within the network 108. Examples of the entities 102 may include a desktop, computing devices, smartphones, laptops, a tablet, voice-enabled devices, and/or the like. It is contemplated that the implementations of the present disclosure may be realized with any appropriate type of entity. Examples of the network resources may include websites/webpages, and/or the like.

The entities 102 access the network resources using internet addresses (also be referred to as Uniform Resource Locators (URLs), domains, or the like). An internet address is a reference or an address that specifies a location of a network resource in the network 108 (e.g., the Internet). The internet address referred herein may be a feature engineered URL including one or more of: a scheme (e.g., Hypertext Transfer Protocol (HTTP) or Hypertext Transfer Protocol Secure (HTTPS)), a sub-domain, a domain, a top-level domain, a path, and/or the like. For example, consider that the internet address includes "https://www.ABC.com/wkday/auth/. In such an example, "https" is the scheme, "www" is the sub-domain, "ABC" is the domain, "com" is the top-level domain, and "wkday/auth/" is the path.

In some examples, each of the entities 102 may include a web browser application executed on a web browser. The web browser application may receive the internet address from the entity 102 and display the related network resource (e.g., a web page, a website, or the like) on the web browser.

In some examples, the back-end system(s) 106 may be implemented as an on-premises system. In some other examples, the back-end system 106 may be implemented as an off-premises system (for example, a cloud or an on-demand system) operated by an enterprise or a third-party on behalf of the enterprise. Additionally, the back-end system 106 may be implemented in a cloud environment. For simplicity, the back-end system 106 depicted in FIG. 1 may be a cloud environment that is intended to represent various forms of servers including a web server, an application server, a proxy server, a network server, a server pool, and/or the like.

Each of the back-end system 106 includes one or more address management systems 114. An address management system 114 hosts an address management application, which may be executed on the entity(ies) 102 to monitor web browsing sessions. A web browsing session may refer to a period of activity within the web browser that initiates with opening of a browser window and terminates with closing of the browser window. During the web browsing session, the entity 102 may access a list of internet addresses (including the one or more internet addresses) for the network resources. Therefore, monitoring the web browsing session may include monitoring the list of internet addresses accessed by the entity 102 in the respective web browsing session. The web browsing sessions/list of internet addresses may be monitored and used only based on an explicit consent received from the user 110 of the entity 102. Further, the monitored list of internet addresses may be stored and deleted as per regulations and the user's prior consent. Therefore, implementations of the present disclosure operate only on the small slice of data that the user has consented to, and do not operate on a full brain scan worth of data.

In accordance with implementations of the present disclosure, the address management system 114 processes the list of internet addresses using a foundation model (as described in detail in conjunction with FIG. 2) and generates one or more predicted classifications of internet addresses. The terms "predicted classifications of internet addresses" and "expected internet addresses" are used interchangeably through the document. The predicted classifications of internet addresses may include internet addresses expected/likely to be accessed by the entity 102 in the respective web browsing session. The internet addresses in the predicted classifications may correspond to trusted/safe internet addresses. The trusted internet addresses may refer to internet addresses directing to legitimate/trusted network resources (for example, legitimate webpages).

The address management system 114 also receives an internet address requested by the entity 102 for the network resource. If the requested internet address is within the predicted classifications of internet addresses, the management system 114 allows the entity 102 to access the requested internet address. If the requested internet address is outside of the one or more predicted classifications of internet addresses, the address management system 114 determines the requested internet address is an untrusted/malicious internet address. The untrusted/malicious internet address may refer to an internet address directing to an illegitimate network resource. Upon determining that the requested internet address is the untrusted internet address, the address management system 114 sends an alert to one or more monitoring entities (described further in detail in conjunction with FIG. 2) and prevents the entity 102 from accessing the untrusted internet addresses.

Various examples depicting the management of internet addresses described in detail in conjunction with FIGS. 2-9.

Figure 2:
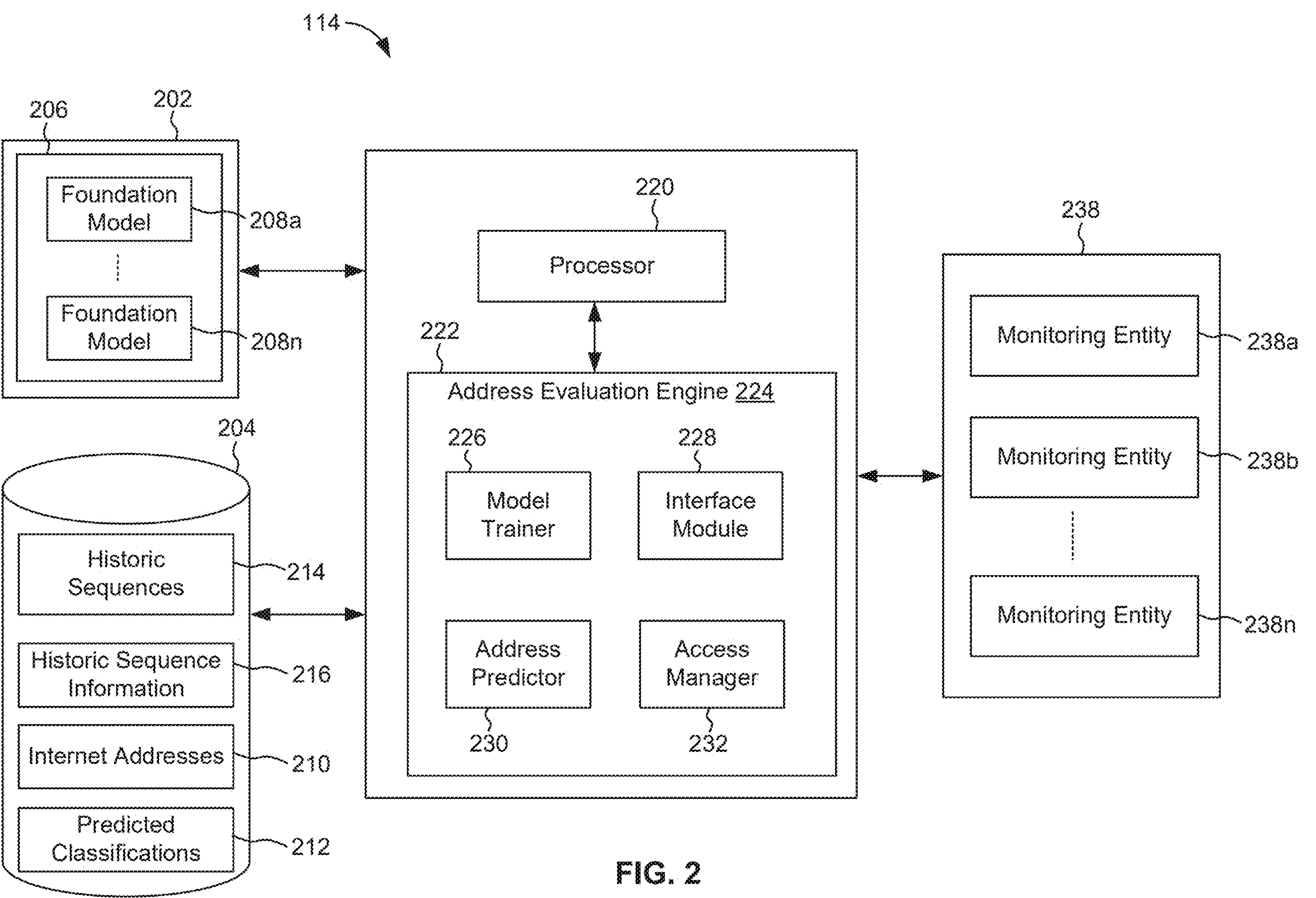
FIG. 2 depicts an example architecture of an address management system for identifying expected internet addresses and generating alerts, in accordance with implementations of the present disclosure.

FIG. 2 depicts an example architecture of an address management system 114 for identifying the expected internet addresses and generating the alert, in accordance with implementations of the present disclosure. As depicted in FIG. 2, the address management system 114 may be configured to communicate with a Generative Artificial Intelligence (GAI) system 202, and a datastore 204.

The GAI system 202 includes a hosting infrastructure 206 to host one or more foundation models 208*a*-208*n*. It should be noted that the GAI system 202 may also include other components such as knowledge base, rules engine, and/or the like (not shown). The knowledge base includes domain knowledge associated with processes that may be executed using the foundation models 208*a*-208*n*. In some examples, the hosting infrastructure 206 represents technical infrastructure(s), where the foundation models 208*a*-208*n* are hosted. Examples of the hosting infrastructure 206 may include cloud computing platforms or the like. In some examples, the hosting infrastructure 206 may host the foundation models 208*a*-208*n* in different types of paradigms, which include, without limitation, model-as-a service (MaaS) models, specialized MaaS (SMaaS) models, self-deployed models, and/or the like.

In some examples, the foundation models 208*a*-208*n* may be described as general-purpose GAI models like large deep learning neural networks. The large deep learning neural network may be trained using a broad range of generalized, unlabeled training data and that may perform one or more intended functions according to the present disclosure. In some examples, address management applications may be built on top of the foundation models 208*a*-208*n* and the foundation models 208*a*-208*n* may be used to perform a range of functionality for the address management applications.

The foundation models 208*a*-208*n* may include, for example, Large Language Models (LLMs), which are a form of GAI that may be used to generate text for a variety of use cases. In some examples, the LLMs may be integrated in digital assistants (for example, chatbots), replacing traditional rule-based systems to provide textual responses to an input. A LLM may be described as an advanced type of language model that is trained using deep learning techniques on massive amounts of text data. The text data is general and not specific to any particular domain. The LLMs may generate human-like text and perform various Natural Language Processing (NLP) tasks (for example, translation, question-answering, and/or the like). In some examples, the LLM refers to models that use deep learning techniques and have a plurality of parameters, which may range from millions to billions. The LLMs may capture complex patterns in language and produce text that is often indistinguishable from that written by humans. The produced text may be processed through a deep learning architecture such as, recurrent neural network (RNN), a transformer model, and/or the like.

In accordance with implementations of the present disclosure, the foundation model 208_a_-208_n_ may receive a request including a list of internet addresses 210 and generate a response for the request. The response may indicate predicted classifications of internet addresses 212 including the trusted internet addresses. The predicted classifications of internet addresses 212 predicts sequence of internet addresses likely to be accessed by the entity 102 after accessing the list of internet addresses 210 in the respective web browsing session.

While implementations of the present disclosure are described in further detail herein with non-limiting reference to the LLMs as the example foundation models 208_a_-208_n_, it is contemplated that implementations of the present disclosure may be realized using any appropriate foundation models or Machine Learning (ML) models, or Artificial Intelligence (AI) models. Such models may be used in generation of the predicted classifications of the internet addresses.

The datastore 204 may act as repository for storing historic sequences of internet addresses 214 and associated historic sequence information 216. The historic sequences of internet addresses 214 may include, for example, millions of internet addresses accessed by different entities 102 over time/different web browsing sessions. Therefore, a comprehensive record of browsing patterns of the different entities 102 may be recorded. The historic sequence information 216 may include user identifications and time stamps of accessing the historic sequences of internet addresses 214. It should be noted that the historic sequences of information 214 and the historic sequence information 216 may be recorded and stored in the datastore 204, based on the explicit consent received from the users of the different entities 102. The historic sequences of internet addresses 214 and the associated historic sequence information 216 may be used for training of the foundation models 208_a_-208_n_. The trained foundation model(s) 208_a_-208_n_ may be used for generating the predicted classifications of internet addresses 212 based on the list of internet addresses 210 accessed by the entity 102, which is described in detail in below along with components of the address management system 114. The datastore 204 may also store the list of internet addresses 210 accessed by the entity 102 and the associated predicted classifications of internet addresses 212.

Still referring to FIG. 2, the address management system 114 includes one or more processors 220 and a memory 222. In some examples, the one or more processors 220 may include, but not limited to, microprocessors, microcomputers, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the one or more processors 220 may be programmed to execute computer-readable instructions stored in the memory 222 (also referred to be as computer-readable storage medium) for performing operations according to the present disclosure. The memory 222 may be non-transitory or non-volatile medium, such as a magnetic disk or solid-state non-volatile memory or volatile medium such as Random Access Memory (RAM), and/or the like.

Further, the address management system 114 includes an address evaluation engine 224, as depicted in FIG. 2. The address evaluation engine 224 may be stored in the memory 222 and provided as a downloadable library including the computer-readable instructions. The address evaluation engine 224 may be configured to identify the expected internet addresses and generate the alert.

The address evaluation engine 224 includes a model trainer 226. The model trainer 226 trains the foundation model 208_a_-208_n_. The trained foundation model 208_a_-208_n_ may be used for generating the predicted classifications of internet addresses 212. The model trainer 226 trains the foundation model 208_a_-208_n_ based on the historic sequences of internet addresses 214 and the associated historic sequence information 216.

For training the foundation model 208_a_-208_n_, the model trainer 226 may access the historic sequences of internet addresses 214 and the associated historic sequence information 216 from the datastore 204. Based on the historic sequences of internet addresses 214 and the historic sequence information 216, the model trainer 226 may create an encoded list of internet addresses. The encoded list of internet addresses may describe a vector representation of the historic sequences of internet addresses 214 and the associated user identification, and timestamps of access to the historic sequences of internet addresses 214.

The model trainer 226 may input the created encoded list of internet addresses to the foundation model 208_a_-208_n_ and train the foundation model 208_a_-208_n_ to generate test sequences of test internet addresses based on the inputted encoded list of internet addresses. The generated test sequences of test internet addresses include test internet addresses, test user identification, and/or test timestamps of access to the test internet addresses. The test internet addresses may correspond to predicted classifications of the historic sequences of internet addresses 214. Therefore, the trained foundation model 208_a_-208_n_ may be effectively used for generation of the predicted classifications of internet addresses in real-time. Training of the foundation model 208_a_-208_n_ is illustrated in detail in conjunction with FIG. 3.

The address evaluation engine 224 further includes an interface module 228, an address predictor 230, and an access manager 232.

The interface module 228 obtains the list of internet addresses 210 accessed by the entity 102. The list of internet addresses 210 may be obtained from the datastore 204 (which has been stored based on the explicit consent obtained from the user of the entity 102). The list of internet addresses 210 represents a history of the internet addresses accessed by the entity 102 in a respective web browsing session. The list of internet addresses may include the domain names. In an example, the interface module 228 provides the list of internet addresses 210 to the address predictor 230 or the address predictor 230 fetches the list of internet addresses 210 from the datastore 204 via the interface module 228.

The address predictor 230 generates the predicted classifications of internet addresses 212 based on the list of the internet addresses 210. The predicted classifications of internet addresses 212 may predict likelihood of internet addresses to be accessed by the entity 102 in the respective web browsing session. In some examples, the predicted classifications of internet addresses 212 may include specific internet addresses, which are the trusted/safe internet addresses. In some other examples, the predicted classifications of internet addresses may include the one or more top-level domains and one or more countries of origin of internet addresses.

The address predictor 230 may optimize generation of the predicted classifications of internet addresses 212 using the foundation model 208*a*-208*n*. For generating the predicted classifications of the internet addresses, the address predictor 230 may input the list of internet addresses 210 to the foundation model 208*a*-208*n*, which is trained to generate the predicted classifications of internet addresses 212. Once the predicted classifications of internet addresses are generated using the foundation model 208*a*-208*n*, the address predictor 230 may store the predicted classifications of internet addresses 212 in the datastore 204. Generating the predicted classifications of internet addresses 212 is described in detail in conjunction with FIGS. 4 and 5.

The interface module 228 also receives an internet address requested by the entity 102. The requested internet address may be the internet address to be accessed/visited by the entity 102 in the respective web browsing session. The interface module 228 may provide the requested internet address to the access manager 232.

The access manager 232 manages access to the requested internet address by determining whether the requested internet address is present in the predicted classifications of the internet addresses 212. If the requested internet address is present in the predicted classifications of the internet addresses 212, the requested internet address may be considered as the trusted (e.g., an intended and safe) internet address. As a result, the access manager 232 allows access to the requested internet address. Once the access to the requested internet address is allowed, the entity 102 may access the requested internet address for the corresponding network resource.

If the requested internet address is outside of or not present within the predicted classifications of the internet addresses 212, the access manager 232 considers the requested internet address as the untrusted internet address. As a result, the access manager 232 generates the alert and sends the alert to the one or more of monitoring entities 238*a*-238*n* (collectively referred to as a monitoring entity 238) through the interface module 228. The alert sent to the monitoring entity 238 may include the internet address and an indication indicating that the internet address is the untrusted/malicious internet address. The access manager 232 also sends the alert to the entity 102 through the interface module 228. The alert sent to the entity 102 indicates that the requested internet address is the untrusted/malicious internet address and not to access such an internet address. Thereby, preventing the entity 102 from reaching a network resource that has not been verified as safe (for example, an illegitimate network resource).

In some examples, the monitoring entity 238 corresponding to the monitoring entities 238*a*-238*n* includes a security alert trigger, an escalation playbook, an automated process to alert a security team and block access, and/or the like. Upon receiving the alert, the monitoring entity 238 checks if the alert is true positive or false positive. If the alert is false positive, the monitoring entity 238 allows the entity 102 to access the requested internet address. If the alert is true positive, the monitoring entity 238 performs one or more actions. The actions performed by the monitoring entity 238 protect against potential threats such as malware, phishing attempts, or other security risks. In some examples, the actions may be performed to block/restrict/report/remove the untrusted internet address. Therefore, the monitoring entity 238 ensures that the entities 102 are threat-free and safe from anomalous attacks by blocking the anomalous internet addresses.

Figure 3:
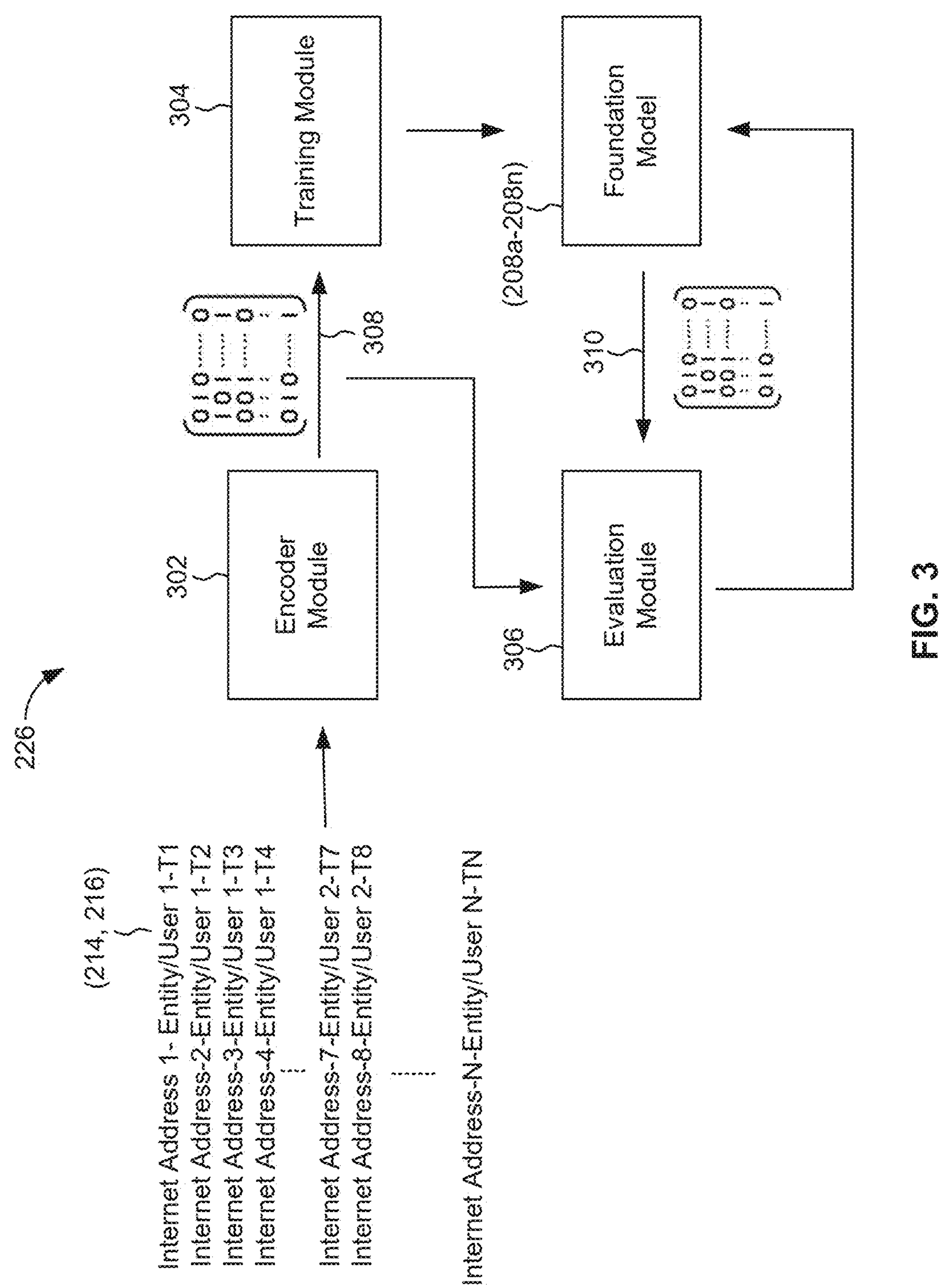
FIG. 3 depicts an example conceptual architecture of a model trainer of the address management system for training a foundation model, in accordance with implementations of the present disclosure.

FIG. 3 depicts an example conceptual architecture of the model trainer 226 of the address management system 114 for training the foundation model 208*a*-208*n* in accordance with implementations of the present disclosure. The model trainer 226 includes an encoder module 302, a training module 304, and an evaluation module 306.

The encoder module 302 obtains the historic sequences of internet addresses 214 and the associated historic sequence information 216 from the datastore 204. The historic sequences of internet addresses 214 may include multiple internet addresses accessed by each of the different entities 102 in a sequence in different web browsing sessions. For example, the historic sequences of internet addresses 214 may include internet addresses 1, 2, 3 accessed in a sequence by a first entity of the entities 102 in a web browsing session A, internet addresses 4, 5, 6 accessed in a sequence by the first entity of the entities 102 in a web browsing session B, internet addresses 7, 9, 9 accessed in a sequence by a second entity of the entities 102 in a web browsing session C, internet address N accessed by an entity N of the entities 102 in a web browsing session N, as depicted in FIG. 3. The historic sequence information 216 may include user identification and timestamps of accessing the internet addresses (of the historic sequences of internet addresses 214) by each of the entities 102.

The encoder module 302 creates an encoded list of internet addresses 308 corresponding to the historic sequences of internet addresses 214 and the associated historic sequence information 216. The encoded list of internet addresses 308 may indicate a vector representation of the historic sequences of internet addresses 214 and the associated historic sequence information 216. In some examples, the encoder module 302 may create the encoded list of internet addresses 308 by independently encoding each of the internet addresses of the historic sequences of internet addresses 214 and the associated historic sequence information 216. In some other examples, the encoder module 302 may create the encoded list of internet addresses 308 by encoding all the internet addresses of the historic sequences of internet addresses 214 and the associated historic sequence information 216 at a time.

The encoder module 302 may create the encoded list of internet addresses 308, by way of non-limiting example, using one-hot encoding. For creating the encoded list of internet addresses 308 using the one-hot encoding, the encoder module 302 may preprocess each of the internet addresses of the historic sequences of internet addresses 214 by extracting keywords and removing hash keys/long symbols from the respective internet address. For example, an internet address (of the historic sequences of internet addresses 214) "https://wd3.myworkday.com/wday/authgwy/ABC/login.htmld?returnTo=%2fABC%2fd%2ftask%2f2998%242739.htmld" may be preprocessed to "https wd3 myworkday com/wday/authgwy/ABC/login.htmld?returnTo=encoded htmld" by extracting keywords and removing long symbols and hash keys. The preprocessed internet addresses of the historic sequences of internet addresses 214 may be encoded into the vector representation/matrix, thereby, creating the encoded list of internet addresses 308.

The training module 304 trains the foundation model 208*a*-208*n* by inputting the encoded list of internet addresses 308 as training data to the foundation model 208*a*-208*n*. In some examples, the foundation model 208*a*-208*n* may be implemented as an autoencoder having multiple layers. Upon receiving the training data, the foundation model 208*a*-208*n* may embed the encoded list of internet addresses 308 in a multi-dimensional vector space and accordingly provide an output data 310 by forecasting next internet addresses in a sequence for each internet address of the training data. The output data 310 may be provided by learning a function that enables the input and/or training data to be created as the output data 310 and learning that the keywords derived from each of the internet addresses in the training data have greater priority than connecting symbols (for example, "/", "=" and "?"). The output data 310 may be a vector representation of the test sequences of internet addresses/sequence-to-sequence prediction. Therefore, with the proposed training, the foundation model 208*a*-208*n* may be trained to learn from the historic sequences of internet addresses 214 to construct a dynamic sequence "language" of internet addresses over time and events.

During inference/production use, the trained foundation model 208*a*-208*n* may be used to generate the predicted classifications of internet addresses 212 based on the list of internet addresses 210 accessed by the entity 102 in the respective web browsing session. The predicted classifications of internet addresses 212 may indicate a next sequence of internet addresses probably to be accessed by the entity 102 in the respective web browsing session. The internet addresses present in the predicted classifications of internet addresses are the trusted internet addresses. Therefore, with the proposed implementations, the trained foundation model 208*a*-208*n* may anticipate future web browsing activities (e.g., a sequence of internet addresses) by analyzing historic browsing patterns. Anticipating the future web browsing activities may be valuable for applications such as personalized content recommendations or network security monitoring.

Further, the foundation model 208*a*-208*n* may be trained iteratively based on the training data to minimize an error between the training data and the output data 310. For example, the evaluation module 306 obtains the training data/encoded list of internet addresses 308 and the output data 310 and determines an error value based on a difference between the training data and the output data 310. The foundation model 208*a*-208*n* may be iteratively trained to reduce the determined error value. In some examples, iteratively training the foundation model 208*a*-208*n* may involve fine-tuning hyperparameters of the foundation model 208*a*-208*n*. Examples of the hyperparameters may include, a number of nodes, an activation function, a learning rate, a batch size, an epoch, and/or the like of the foundation model 208*a*-208*n*.

With the proposed effective training of the foundation model 208*a*-208*n*, the foundation model 208*a*-208*n* may learn to predict the sequence of internet addresses rather than mimicking probable web browsing pathways.

Figure 4:
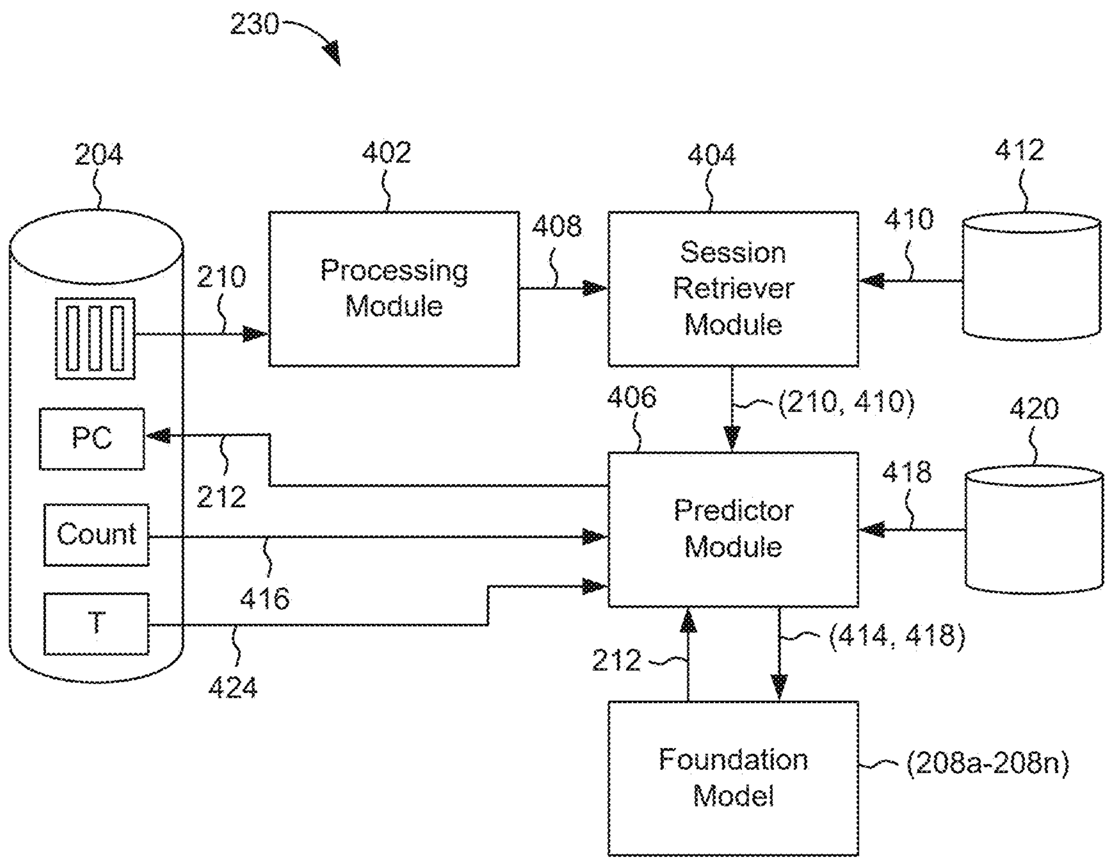
FIG. 4 depicts an example conceptual architecture of an address predictor of the address management system for generating the expected internet address, in accordance with implementations of the present disclosure.

FIG. 4 depicts an example conceptual architecture of the address predictor 230 for generating the predicted classifications of internet addresses, in accordance with implementations of the present disclosure. The address predictor 230 includes a processing module 402, a session retriever module 404, and a predictor module 406.

The processing module 402 obtains the list of internet addresses 210 accessed by the entity 102. The list of internet addresses 210 may refer to the history of internet addresses/web traffic logs accessed by the entity 102 in an ongoing web browsing session. The list of internet addresses 210 of the web browsing session may be monitored and stored in the datastore 204 based on the explicit consent received from the user of the entity 102.

Further, the processing module 402 creates the encoded list of internet addresses 408 by processing the list of internet addresses 210. Processing the list of internet addresses 210 may include extracting keywords and removing long symbols/hash keys from each of the internet addresses in the list of internet addresses 210. As a non-limiting example, the processing module 402 may create the encoded list of internet addresses 408 using one-hot encoding, which is similar to creating the encoded list of internet addresses 308 for the historic sequences of internet addresses 214. Therefore, the repeated description is omitted herein for sake of brevity.

Upon creating the encoded list of internet addresses 408, the session retriever module 404 retrieves one or more web browsing sessions 410 from a transactional database 412. Each of the retrieved web browsing sessions 410 may include internet addresses matching the encoded list of internet addresses 408. The transactional database 412 may store multiple web browsing sessions of the different entities (based on the explicit consent received from the users of the different entities). Each of the one or more web browsing sessions 410 may include the one or more internet addresses. The internet addresses of each of the one or more web browsing sessions 410 may be stored in the transactional database 412 in its encoded format. The session retriever module 404 may provide the list of internet addresses 210 and the corresponding web browsing sessions 410 as inputs to the predictor module 406.

The predictor module 406 creates a pseudo prompt 414, based on the inputs received from the session retriever module 404. The pseudo prompt 414 may be used for prompting/calling the trained foundation model 208*a*-208*n* for generation of the predicted classifications of internet addresses 212. The pseudo prompt may include the list of internet addresses 210 accessed by the entity 102, the retrieved one or more web browsing sessions 410 for the list of internet addresses 210, and a 'X' count of internet addresses 416. The 'X' count of internet addresses 416 may be obtained from the datastore 204. In an example, the 'X' count of internet addresses 416 may indicate a maximum number of internet addresses to be predicted based on the list of internet addresses 210. In some implementations, the web browsing sessions 410 may be retrieved based on the 'X' count of internet addresses 416. Therefore, the retrieved web browsing sessions 410 may include a number of internet addresses matching the 'X' count of internet addresses 416.

It should be noted that the 'X' count of internet addresses 416 may indicate any long sequence of internet addresses due to the usage of the foundation model 208*a*-208*n*. As a non-limiting example, the 'X' count of internet addresses 416 may indicate 500+ internet addresses. Therefore, including the 'X' count of internet addresses 416 in the pseudo prompt 414 may configure output conditions for the foundation model 208*a*-208*n*, which enables the foundation model 208*a*-208*n* to iteratively identify next internet addresses in the sequence until satisfying the 'X' count of internet addresses 416 and/or output conditions. In an example, the pseudo prompt 414 may be created as "what are the top 'X' likely next sites for the list of internet addresses . . . ?".

After creating the pseudo prompt 414, the predictor module 406 obtains registered internet addresses 418 from a registered domain database 420. The registered domain database 420 includes all the registered internet addresses 418, which may be either the trusted internet addresses or untrusted internet addresses. The predictor module 406 may only check for the internet addresses (irrespective of trusted or untrusted), which are required to be accessible for the network resources.

The predictor module 406 inputs the pseudo prompt 414 and the registered internet addresses 418 to the foundation module 208*a*-208*n* for generation of the predicted classifications of the internet addresses (PC) 212 based on the pseudo prompt 414 and the registered internet addresses 418.

For example, based on the list of internet addresses 210 and the similar web browsing sessions 410 in the pseudo prompt 414, the predictor module 406 may use the foundation model 208*a*-208*n* to predict a subsequent internet address and associated probability. The probability may indicate chances of accessing the predicted next internet address. Further, the predictor module 406 may use the foundation model 208*a*-208*n* iteratively to predict subsequent internet addresses in a sequence and associated probabilities (as described above) until predicting the 'X' count of internet addresses 416 as indicated in the pseudo prompt 414. Once the predicted number of subsequent internet addresses satisfy the 'X' count of internet addresses 416, the predictor module 406 may compare the probability of each of the predicted subsequent internet addresses with a threshold (T) 424 (obtained from the datastore 204). The threshold 424 may be based on the prediction of the 'X' count of the internet addresses 416 likely to be accessed by the entity 102. As a non-limiting example, the threshold 424 may be dynamically determined based on certain rules such as a number of known internet addresses accessed by the entity 102, or the like. Based on the comparison, the predictor module 406 generates the predicted classifications of internet addresses 212 by including the predicted subsequent internet addresses having the probabilities greater than the threshold 424. The predictor module 406 omits and/or generates the alert for the predicted subsequent internet addresses having the probabilities lesser than the threshold 424. The alert may be provided to the monitoring entity 238 for performing the one or more actions.

Figure 5:
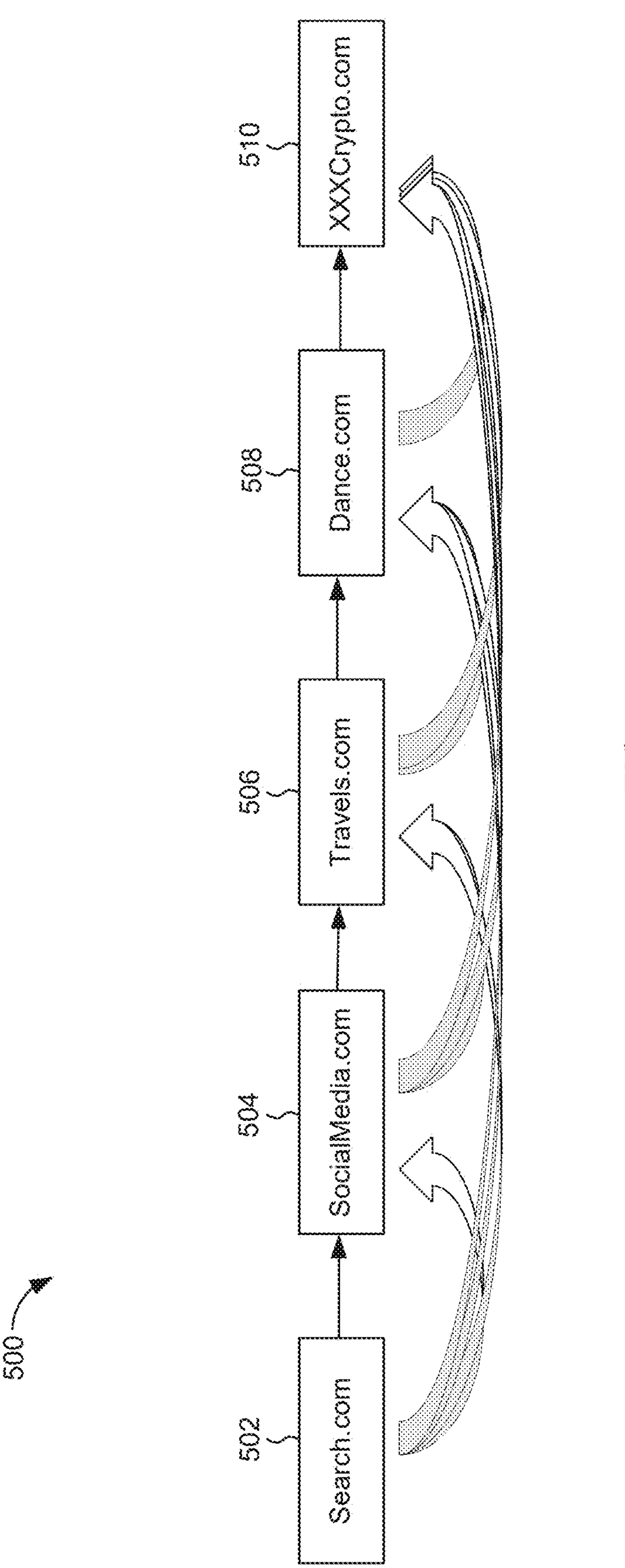
FIG. 5 depicts an example illustration of generating the expected internet address, in accordance with implementations of the present disclosure.

Consider an example scenario 500, as depicted in FIG. 5, wherein the entity 102 initiates a web browsing session A and initiated accessing of "Search.com" 502 (example of an internet address in the list of internet address 210) for accessing network resource. In such a scenario, one or more predicted classifications of internet addresses 212 for "Search.com" 502 may be generated. The predicted classifications of internet addresses 212 indicate one or more internet addresses likely to be accessed/visited by the entity 102 after accessing "Search.com" 502 in the web browsing session A.

For generating the predicted classifications of internet addresses 212 for "Search.com" 502, the predictor module 406 predicts a subsequent internet address as "SocialMedia.com" 504 and associated probability as 0.8. The probability of "SocialMedia.com" 504 may indicate the chances of accessing the "SocialMedia.com" 504 by the entity 102 after the "Search.com" 502. After predicting the "SocialMedia.com" 504, the predictor module 406 predicts a subsequent internet address as "Travels.com" 506 and probability of the "Travels.com" 506 as 0.7. The probability of "Travels.com" 506 may indicate the chances of accessing the "Travels.com" 506 by the entity 102 after the "SocialMedia.com" 504 and after the "Search.com" 502.

Similarly, for the "Travels.com" 506, the predictor module 406 predicts a subsequent internet address as "Dance.com" 508 and a probability as 0.5. The probability of "Dance.com" 508 may indicate the chances of accessing the "Dance.com" 508 by the entity 102 after the "Travels.com" 506, after the "SocialMedia.com" 504, and after the "Search.com" 502. For the "Dance.com" 508, the predictor module 406 predicts a subsequent internet address as "XXXCrypto.com" 510 and associated probability as 0.1. The probability of "XXXCrypto.com" 510 may indicate the chances of accessing the "XXXCrypto.com" by the entity 102 after the "Dance.com" 508, after the "Travels.com" 506, after the "SocialMedia.com" 504, and after the "Search.com" 502.

The predictor module 406 generates the predicted classifications of internet addresses 212 for "Search.com" 502 by including the "SocialMedia.com" 504, the "Travels.com" 506, and the "Dance.com" 508, as these internet addresses have the probabilities greater than or equal to the threshold 424 (for example, determined as 0.5). The predictor module 406 omits the "XXXCrypto.com" 510 from the predicted classifications of internet addresses 212, as the "XXXCrypto.com" 510 has the probability less than the threshold 424. Such a less probability for the "XXXCrypto.com" 510 may be generated, as the "XXXCrypto.com" has no historical context to support a navigation of the "XXXCrypto.com" 510 after the "Dance.com" 508, after the "Travels.com" 506, after the "SocialMedia.com" 504, and after the "Search.com" 502. Therefore, the "XXXCrypto.com" 510 may be considered not only rare but obscure. Further, the predictor module 406 generates the alert for the "XXXCrypto.com" 510 by considering the "XXXCrypto.com"510 as the untrusted/malicious internet address.

Therefore, in accordance with implementations of present disclosure, the predicted classification of internet addresses/top 'X' internet addresses likely to be accessed by the entity 102 may be generated based on the web browsing behavior/patterns of the entity 102. The top 'X' internet addresses may include the trusted internet addresses.

Figure 6:
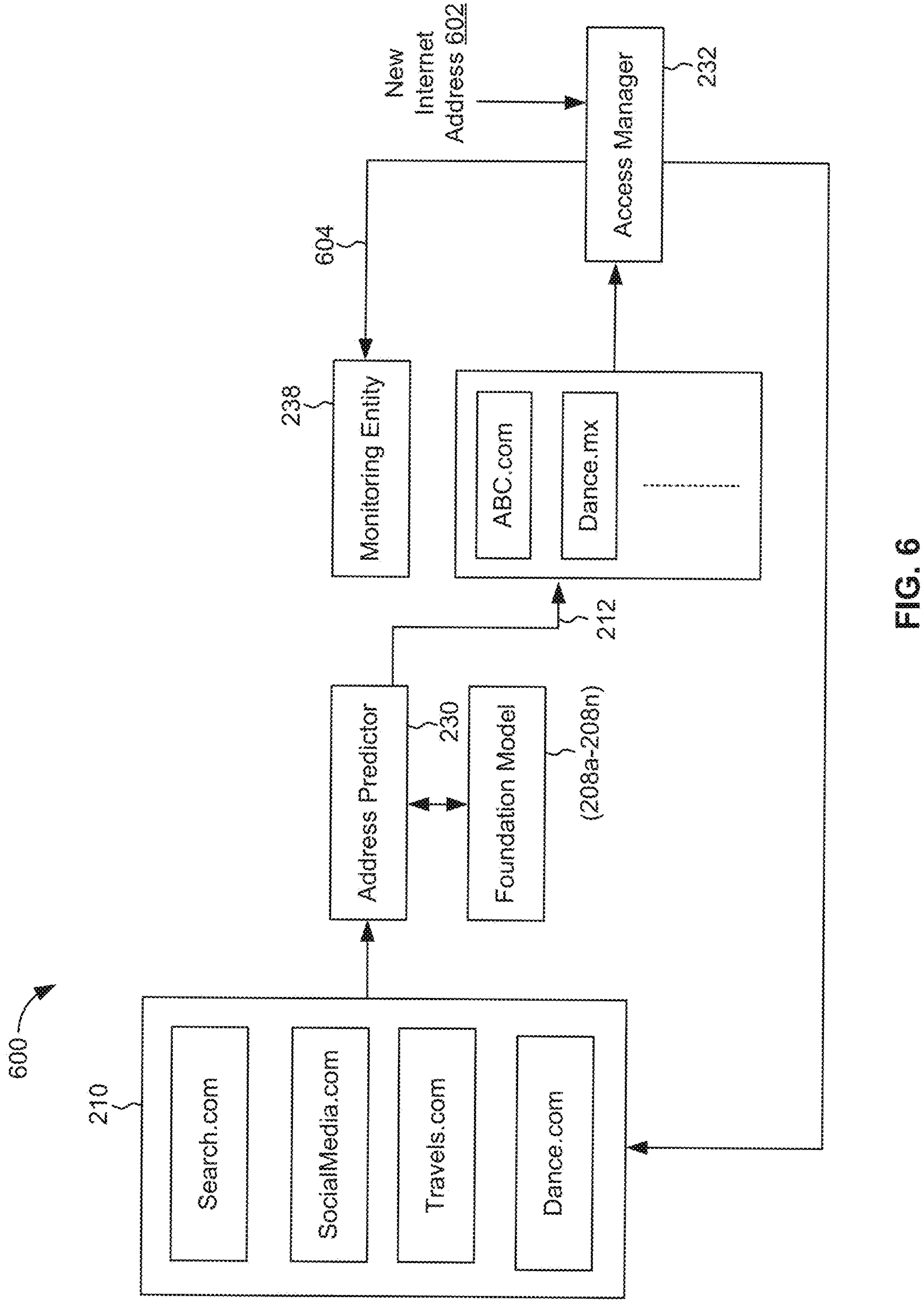
FIG. 6 depicts an example illustration of managing access to a requested internet address based on the expected internet addresses, in accordance with implementations of the present disclosure.

FIG. 6 depicts an example illustration of managing access to the requested internet address based on the predicted classifications of internet addresses 212, in accordance with implementations of the present disclosure.

Consider another example scenario 600, as depicted in FIG. 6, wherein the list of internet addresses 210 accessed by the entity 102 during a web browsing session A includes "Search.com", "SocialMedia.com", "Travels.com", and "Dance.com". In such a scenario, the address predictor 230 uses the foundation model 208*a*-208*n* and generates the predicted classifications of internet addresses 212 as "ABC.com", "Dance.mx", and/or the like.

Further, the access manager 232 receives a new internet address 602 being accessed by the entity 102 after "Dance.com". In such a scenario, the access manager 232 determines whether the new internet address 602 is present in the predicted classifications of internet addresses 212. Thereby, the predictor module 406 evaluates whether the list of internet addresses 210 and/or sequence of previously accessed internet addresses provides adequate context for the new internet address 602.

If the new internet address 602 is not present in the predicted classifications of internet addresses 212, the access manager 232 determines that the new internet address 602 deviates from the predicted classifications/sequence patterns of internet addresses 212 and accordingly the new internet address 602 has no sufficient contextual support from the previous web browsing patterns. As a result, the access manager 232 identifies the new internet address 602 as the untrusted internet address and triggers a security alert/playbook/automation process 604 for further validating the new internet address. Therefore, the proposed implementations aid in differentiating between normal deviations in browsing behavior and potential security threats, minimizing false positives and enhancing overall accuracy in detecting suspicious activities.

If the new internet address 602 is present in the predicted classifications of internet addresses 212, the access manager 232 adds the new internet address 602 to the list of internet address 210 for subsequent generation of the predicted classifications of internet addresses 212.

Figure 7:
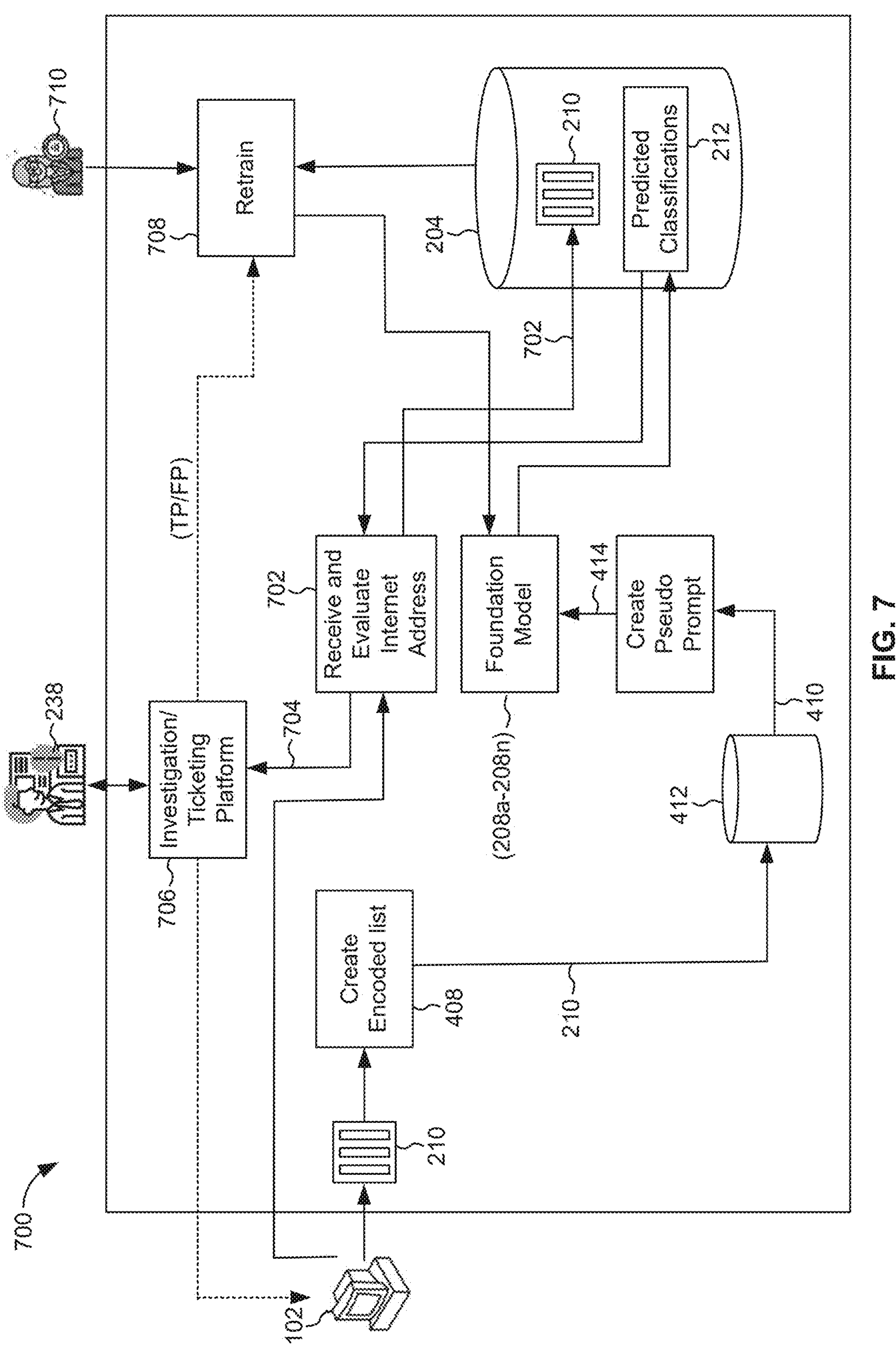
FIG. 7 depicts an example process flow of managing and controlling access to internet addresses, in accordance with implementations of the present disclosure.

FIG. 7 depicts an example process flow 700 of identifying the expected internet addresses and managing access of the requested internet address based on the expected internet addresses, in accordance with implementations of the present disclosure.

The address management system 114 monitors web traffic logs of the web browsing session initiated by the entity 102 and obtains the list of internet addresses 210 accessed by the entity 102 in a queue. The list of internet addresses 210 includes a history of internet addresses accessed by the entity 102 in the respective web browsing session. The address management system 114 processes the list of internet addresses 210 and creates the encoded list of internet addresses 408 by encoding each internet address present in the list of internet addresses 210.

Upon creating the encoded list of internet addresses 408, the address management system 114 retrieves, from the transactional database 412, the one or more web browsing sessions 410 by the 'X' count of internet addresses 416 determined for generation of the expected internet addresses. The 'X' count of internet addresses 416 may be indicative of a number of internet addresses to be predicted. Each web browsing session may include the list of addresses matching the encoded list of internet addresses 408.

Further, the address management system 114 generates the pseudo prompt 414 by including the list of internet addresses 210, the retrieved web browsing sessions 410, and the 'X' count of internet addresses 416. The addresses management system 114 prompts the foundation model **208*a*-208*n* using the pseudo prompt 414 and the registered internet addresses 418 for generation of the predicted classifications of internet addresses 212. The predicted classifications of internet addresses 212 correspond to the internet addresses expected to be accessed by the entity 102 in the respective web browsing session. The address management system 114 stores the list of internet addresses 210 and the associated predicted classifications of internet addresses/expected internet addresses 212 in the datastore 204**.

The address management system 114 further receives the internet address 702 requested by the entity 102 in the respective web browsing session. The address management system 114 determines if the requested internet address 702 is within the predicted classifications of internet addresses 212. If the requested internet address is within the predicted classifications of internet addresses 212, the address management system 114 allows access to the requested internet address 702 and adds the requested internet address 702 to the list of internet addresses 210. If the requested internet address is outside of the predicted classifications of internet addresses 212, the address management system 114 sends the alert 704 to the monitoring entity 238. The monitoring entity 238 may include an investigation/ticketing platform 706, which investigates the alert to determine if the alert if true positive (TP) or false positive (FP) and accordingly performs the one or more actions. If the alert is false positive, the monitoring entity 238 may ignore the alert. If the alert is true positive, the monitoring entity 238 may perform the actions such as blacklisting the internet address by considering the internet addresses as the malicious internet address, or the like. In addition, the monitoring entity 238 may initiate automated/semiautomated remediation flows for preventing the entity 102 from accessing the malicious internet address.

Consider an example scenario, wherein the entity 102 initiates a web browsing session and accesses an internet address, for example, "SocialMedia.com" for social media websites. In the respective browsing session, the entity 102 finds a travel advertisement on a travel website related to a location "ABC" and proceeds to search flights to the location "ABC" on the travel website using an example internet address "Travels.com". Thereafter, the entity 102 searches for dance classes, which bring the entity 102 to a rare and obscure internet address, for example, "ABCDance.com" for a local dance studio in the location "ABC". Available rule-based solutions may flag such a rare and obscure internet address "ABCDance.com" as the malicious/anomalous domain and initiate a human investigation, which may result in false positive and wasted human effort. In contrast to such available rule-based solutions, the proposed implementations may not flag the internet address "ABCDance.com" as the malicious/anomalous domain, as the respective internet address "ABCDance.com" is present in the predicted classifications of internet addresses 212 (generated due to context of surfing/web browsing history). Presence of the internet address "ABCDance.com" in the predicted classifications of internet addresses 212 may indicate that the internet address "ABCDance.com" may be the probable/expected internet address to be accessed by the entity 102 after the internet address "travels.com" in the respective browsing session.

Further, consider that the entity 102 continues the browsing session and a malware triggers the entity 102 to access a financial/crypto hosted in a location "DEF" using an example internet address "XXXCrypto.com". In such a scenario, the proposed implementations flag the internet address "XXXCrypto.com" as the malicious/anomalous internet address and prevent the entity 102 from accessing "XXXCrpto.com", as the internet address "XXXCrypto.com" is not present in the predicted classifications of internet addresses 212 and has no historical context to support a navigation from the "ABCDance.com" to the "XXXCrypto.com. Therefore, with the proposed implementations, the malicious/anomalous internet addresses may be identified with high accuracy based on the historical browsing/surfing context.

In some implementations, the address management system 114 also performs retraining 708 of the foundation model **208*a*-208*n* periodically. The address management system 114 may initiate retraining of the foundation model 208*a*-208*n* based on inputs obtained from the monitoring entity 238 and a cyber security platform 710. The inputs obtained from the monitoring entity 238 may include true positive (TP) or false positive (FP) labels associated with the internet addresses. The inputs obtained from the cyber security platform 710 may include a result of historical analysis of the internet addresses performed by an associated cyber security team. Further, the address management system 114 may retrain the foundation model 208***a*-208*n* based on the historic sequences of internet addresses obtained from the datastore 204. The historic sequences of internet addresses include the list of internet address 210 accessed by the entity 102, and/or the list of internet addresses accessed by the different entities in different web browsing sessions. The foundation model 208*a*-208*n* may be retrained as similar to training of the foundation model 208*a*-208*n* as described in conjunction with FIG. 3, therefore repeated description is omitted herein.

Figure 8:
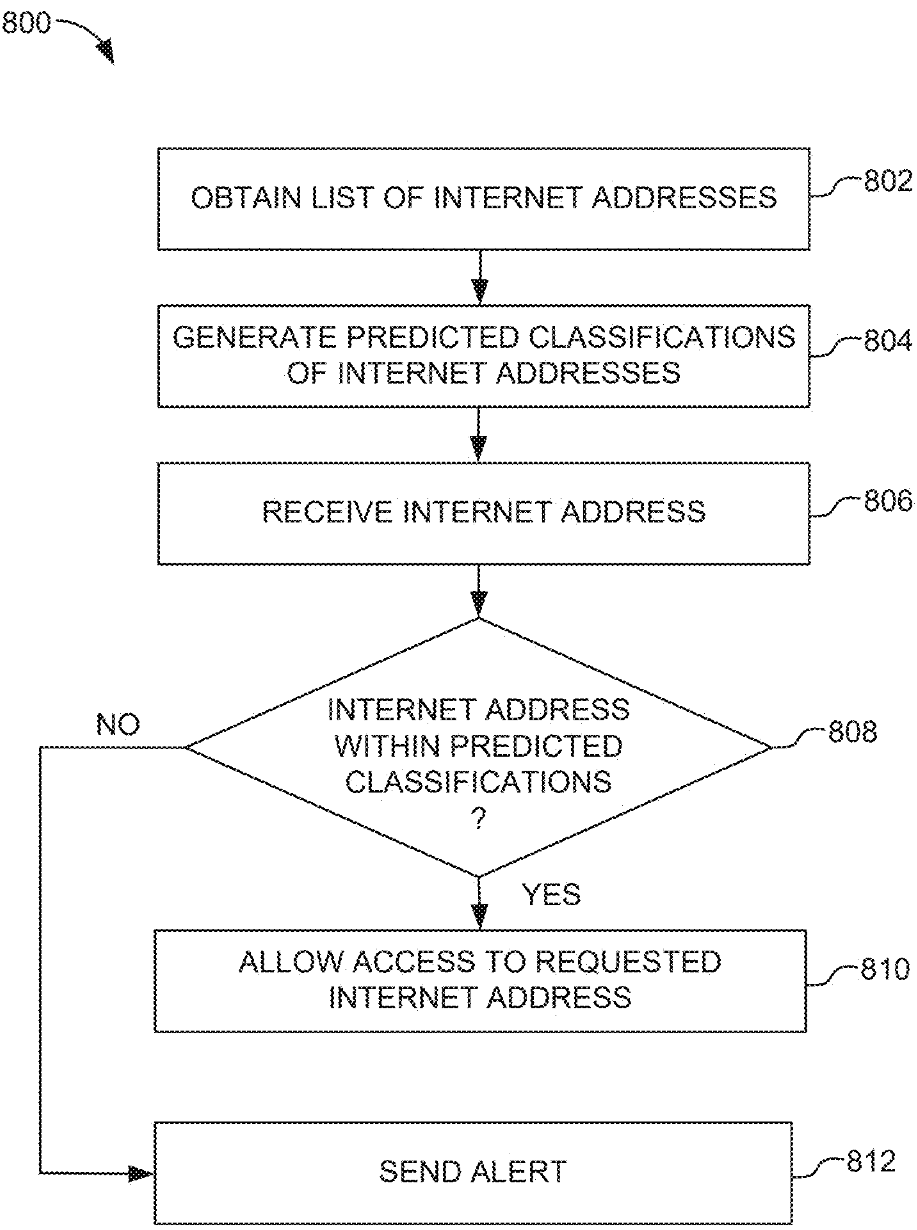
FIG. 8 is a flow diagram that presents an example method for managing and controlling access to the internet addresses, in accordance with implementations of the present disclosure.

FIG. 8 is a flow diagram that presents an example computer implemented method 800 for managing internet addresses, in accordance with implementations of the present disclosure. In some implementations, the method 800 may be executed by the one or more processors 220 of the address management system 114, as described in relation to FIGS. 2-7.

At step 802, the method 800 includes obtaining the list of internet addresses. The list of internet addresses represents the history of internet addresses accessed by the entity 102 during the web browsing session. The list of internet addresses may include one or more internet addresses/domains. Examples of the internet addresses may include "Search.com", "SocialMedia.com", and/or the like.

At step 804, the method 800 includes generating using the foundation model 208*a*-208*n*, the one or more predicted classifications of internet addresses based upon the list of internet addresses. The predicted classifications of internet addresses may include the internet addresses that are expected to be accessed by the entity 102.

In some implementations, the foundation model 208*a*-208*n* may be trained for generation of the predicted classifications of internet addresses. The foundation model 208*a*-208*n* may be trained based on the historic sequences of internet addresses accessed by the different entities. For training the foundation model 208*a*-208*n*, the method 800 includes creating the encoded list of internet addresses. The encoded list of internet addresses may include vector representation of the historic sequence of internet addresses and the associated user identification and timestamps of access to the historic sequence of internet addresses. Further, the encoded list of internet addresses may be inputted to the foundation model 208*a*-208*n* for generating test sequences of test internet addresses. The test sequences of test internet addresses include test internet addresses, test user identification and test timestamps of access to the test internet addresses. The trained foundation model 208*a*-208*n* may be used to generate the predicted classifications of internet addresses. Generating the predicted classifications of internet addresses is described in detail in conjunction with FIGS. 4 and 5, therefore repeated description is omitted herein.

In some examples, the predicted classifications of internet addresses may include specific internet addresses corresponding to the trusted internet addresses. In some other examples, the predicted classifications of internet addresses may include one or more top-level domains. In some other examples, the predicted classifications of internet addresses may include one or more countries of origin of the internet addresses.

At step 806, the method 800 includes receiving from the entity 102, the requested internet address. At step 808, the method 800 includes determining if the requested internet address is within the predicted classifications of internet address.

If the requested internet address is within the predicted classifications of internet addresses, at step 810, the method 800 includes allowing access to the requested internet address. If the access has been allowed, the method 800 includes adding the requested internet address to the list of internet address.

If the requested internet address is outside of the predicted classifications of internet addresses, at step 812, the method 800 includes sending the alert to the monitoring entity 238. The method includes determining if the requested internet address is outside of the predicted classifications of internet addresses based upon probability that the requested internet address is an intended and safe internet address. In some examples, the monitoring entities include one or more of: a security alert trigger, an escalation playbook, and/or automated process to alert a security team and block access.

Implementations of the present disclosure provide technical solutions to multiple technical problems that arise in the context of threat detection. The proposed methodology herein for predicting/forecasting likelihood of web browsing sequence of internet addresses based on processing of the historic sequences of internet addresses using the foundation model improves accuracy of malicious activity analysis. Further, the proposed methodology for identifying if the requested internet address is trusted or malicious based on the predicted likelihood of the web browsing sequence of internet addresses improves accuracy, a confidence level of identifying the trusted or malicious internet addresses, a rate of true positives, a rate of false positives, and/or the like. Therefore, the proposed methodology improves overall security of the entity, while enhancing threat detection and prevention capabilities.

Implementations of the present disclosure further enable the monitoring entity to perform a wide variety of reactive measures that improves detection and remediation of potential threats to the entity.

Implementations of the present disclosure further offer various advantages for managing internet addresses and enhancing security. By integrating the foundation model with address prediction and classification, internet addresses may be accurately forecasted and classified based on historical browsing data. This predictive capability helps in proactively identifying and mitigating potential threats, such as malware or phishing attempts, by alerting users or security teams when accessing anomalous or unsafe sites. Further, implementations of the present disclosure provide an ability to dynamically update classifications of internet addresses based on historical data, which ensures that security measures remain relevant and effective. Additionally, the incorporation of real-time monitoring and alert mechanisms enhance responsiveness to emerging threats, while training of foundation models on extensive browsing records improves prediction accuracy and adaptability.

Overall, the implementations of the present disclosure provide a robust framework for safeguarding the entity against internet-based risks, optimizing browsing experiences, and maintaining a secure online environment.

Figure 9:
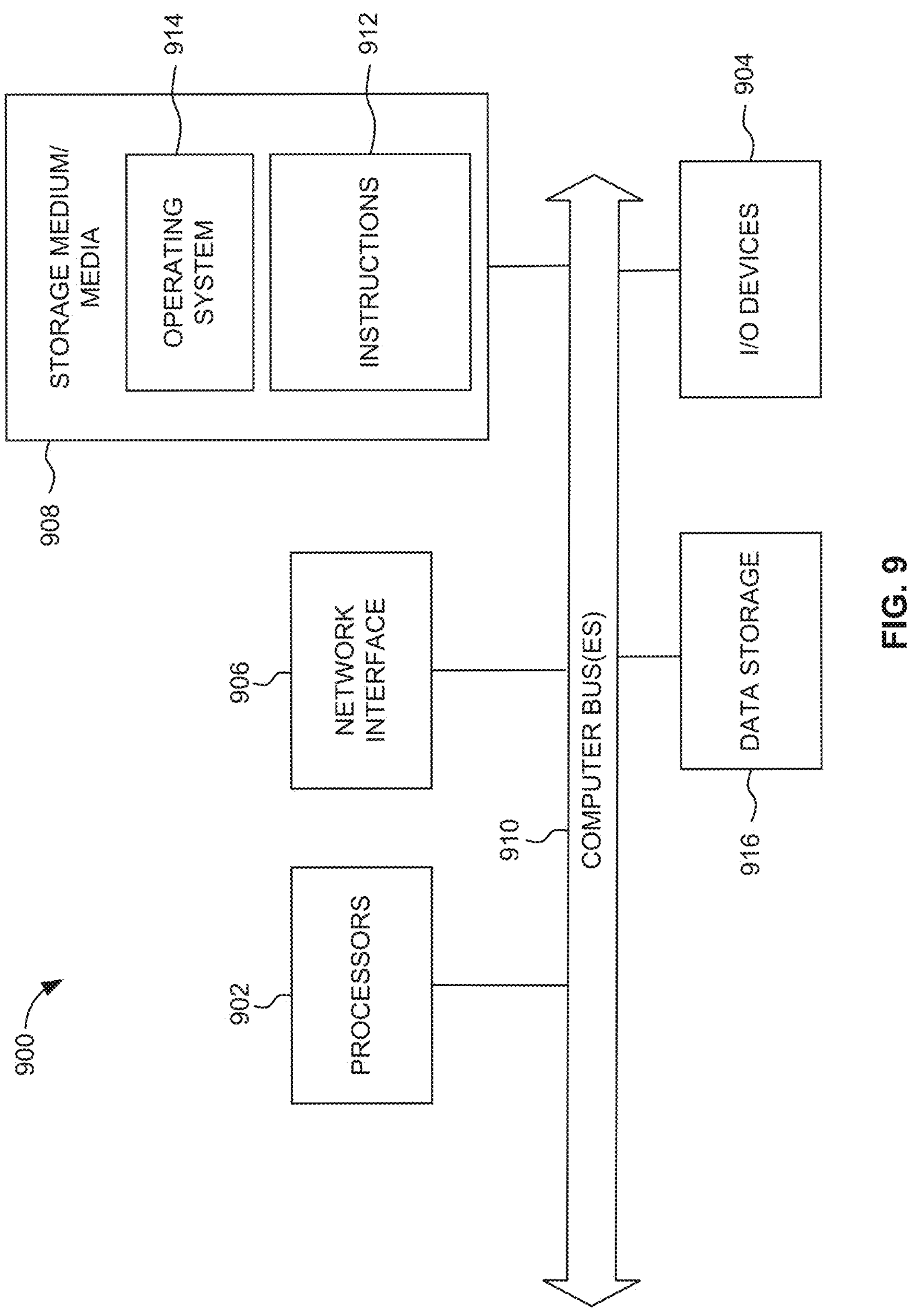
FIG. 9 illustrates a computer system that may be used to implement the address management system.

FIG. 9 illustrates a computer system 900 that may be used to implement the address management system 114. More particularly, computing machines such as desktops, laptops, smartphones, tablets, and wearables which may be used to manage the internet address. The computer system 900 may include additional components not shown and that some of the process components described may be removed and/or modified. In another example, a computer system 900 may be deployed on external-cloud platforms such as cloud, internal corporate cloud computing clusters, organizational computing resources, and/or the like.

The computer system 900 includes processor(s) 902, such as a central processing unit, ASIC or another type of processing circuit, input/output devices 904, such as a display, mouse keyboard, etc., a network interface 906, such as a Local Area Network (LAN), a wireless 802.11x LAN, a 3G or 4G mobile WAN or a WiMax WAN, and a processor-readable medium 908. Each of these components may be operatively coupled to a bus 910. The computer-readable medium 908 may be any suitable medium that participates in providing instructions to the processor(s) 902 for execution. For example, the computer-readable medium 908 may be non-transitory or non-volatile medium, such as a magnetic disk or solid-state non-volatile memory or volatile medium such as RAM. The instructions or modules stored on the computer-readable medium 908 may include machine-readable instructions 912 executed by the processor(s) 902 that cause the processor(s) 902 to perform the methods and functions of the address management system 114.

The address management system 114 may be implemented as software stored on a non-transitory processor-readable medium and executed by the processor(s) 902. For example, the computer-readable medium 908 may store an operating system 914, such as MAC OS, MS WINDOWS, UNIX, or LINUX, and code, for the address management system 114. The operating system 914 may be multi-user, multiprocessing, multitasking, multithreading, real-time, and the like. For example, during runtime, the operating system 914 is running and the code for the address management system 114 is executed by the processor(s) 902.

The computer system 900 may include a data storage 916, which may include non-volatile data storage. The data storage 916 stores any data used or generated by the address management system 114.

The network interface 906 connects the computer system 900 to internal systems for example, via a LAN. Also, the network interface 906 may connect the computer system 900 to the Internet. For example, the computer system 900 may connect to web browsers and other external applications and systems via the network interface 906.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 902 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer implemented method for identifying expected internet addresses and generating alerts, the method being executed by one or more processors and comprising:

obtaining a list of internet addresses, the list of internet addresses representing a history of internet addresses accessed by an entity;

generating, using a foundation model, one or more predicted classifications of internet addresses based upon the list of internet addresses by sequentially forecasting forthcoming internet addresses for each of the list of internet addresses, wherein sequentially forecasting the forthcoming internet addresses comprises:

extracting keywords and connecting symbols from each of the list of internet addresses; and constructing a dynamic sequence of the forthcoming internet addresses by prioritizing the extracted keywords over the extracted connecting symbols;

receiving, from the entity, a requested internet address;

allowing access, if the requested internet address is within the one or more predicted classifications of internet addresses, to the requested internet address, wherein the requested internet address is within the one or more classifications of predicted internet addresses when the requested internet address includes one or more of the extracted keywords from each of the list of internet addresses; and sending an alert, if the requested internet address is outside of the one or more predicted classifications of internet addresses, to one or more monitoring entities.

2. The computer implemented method of claim 1, wherein the one or more predicted classifications of internet addresses includes specific internet addresses.

3. The computer implemented method of claim 1, wherein the one or more predicted classifications of internet addresses includes one or more top-level domains.

4. The computer implemented method of claim 1, wherein the one or more predicted classifications of internet addresses includes one or more countries of origin of the internet address.

5. The computer implemented method of claim 1, further comprising: determining if the request internet address is outside of the one or more predicted classifications of internet addresses is based upon probability that the requested internet address is an intended and safe internet address.

6. The computer implemented method of claim 1, further comprising: adding, if access has been allowed, the requested internet address to the list of internet addresses.

7. The computer implemented method of claim 1, wherein the one or more monitoring entities includes at least one of a security alert trigger, an escalation playbook, and/or an automated process to alert a security team and block access.

8. The computer implemented method of claim 1, wherein internet addresses, of the list of predicted internet addresses includes domain names.

9. The computer implemented method of claim 1, wherein the foundation model is trained based on historic sequences of internet addresses accessed by different entities.

10. The computer implemented method of claim 9, wherein the foundation model is trained by:

creating an encoded listing of internet addresses that include the historic sequences of internet addresses and associated user identification and timestamps of when the internet address was accessed; and inputting the encoded listing of internet addresses to the foundation model for training.

11. The computer implemented method of claim 10, further comprising training the foundation model by generating test sequences of test internet addresses that include associated test user identification and test timestamps of when the test internet address was accessed.

12. The computer implemented method of claim 11, optimizing the generating, using the foundation model, the one or more predicted classifications of internet addresses.

13. A non-transitory computer-readable storage medium coupled to one or more processors and having instructions stored thereon which, when executed by the one or more processors, cause the one or more processors to perform operations for identifying expected internet addresses and generating alerts, the operations comprising:

obtaining a list of internet addresses, the list of internet addresses representing a history of internet addresses accessed by an entity;

generating, using a foundation model, one or more predicted classifications of internet addresses based upon the list of internet addresses by sequentially forecasting forthcoming internet addresses for each of the list of internet addresses, wherein sequentially forecasting the forthcoming internet addresses comprises:

extracting keywords and connecting symbols from each of the list of internet addresses; and constructing a dynamic sequence of the forthcoming internet addresses by prioritizing the extracted keywords over the extracted connecting symbols;

receiving, from the entity, a requested internet address;

allowing access, if the requested internet address is within the one or more predicted classifications of internet addresses, to the requested internet address, wherein the requested internet address is within the one or more classifications of predicted internet addresses when the requested internet address includes one or more of the extracted keywords from each of the list of internet addresses; and sending an alert, if the requested internet address is outside of the one or more predicted classifications of internet addresses, to one or more monitoring entities.

14. The non-transitory computer-readable storage medium of claim 13, wherein the one or more predicted classifications of internet addresses includes specific internet addresses.

15. The non-transitory computer-readable storage medium of claim 13, wherein the one or more predicted classifications of internet addresses includes one or more top-level domains.

16. The non-transitory computer-readable storage medium of claim 13, wherein the one or more predicted classifications of internet addresses includes one or more countries of origin of the internet address.

17. The non-transitory computer-readable storage medium of claim 13, further comprising: determining if the request internet address is outside of the one or more predicted classifications of internet addresses is based upon probability that the requested internet address is an intended and safe internet address.

18. The non-transitory computer-readable storage medium of claim 13, further comprising: adding, if access has been allowed, the requested internet address to the list of internet addresses.

19. The non-transitory computer-readable storage medium of claim 13, wherein the one or more monitoring entities includes at least one of a security alert trigger, an escalation playbook, and/or an automated process to alert a security team and block access.

20. A system comprising:

one or more processors; and a non-transitory computer-readable storage medium coupled to the one or more processors and having instructions stored thereon which, when executed by the one or more processors, cause the one or more processors to perform operations for identifying expected internet addresses and generating alerts, the operations comprising:

obtaining a list of internet addresses, the list of internet addresses representing a history of internet addresses accessed by an entity;

generating, using a foundation model, one or more predicted classifications of internet addresses based upon the list of internet addresses by sequentially forecasting forthcoming internet addresses for each of the list of internet addresses, wherein sequentially forecasting the forthcoming internet addresses comprises:

extracting keywords and connecting symbols from each of the list of internet addresses; and constructing a dynamic sequence of the forthcoming internet addresses by prioritizing the extracted keywords over the extracted connecting symbols;

receiving, from the entity, a requested internet address;

allowing access, if the requested internet address is within the one or more predicted classifications of internet addresses, to the requested internet address, wherein the requested internet address is within the one or more classifications of predicted internet addresses when the requested internet address includes one or more of the extracted keywords from each of the list of internet addresses; and sending an alert, if the requested internet address is outside of the one or more predicted classifications of internet addresses, to one or more monitoring entities.

* * * * *